US011036645B2

(12) United States Patent
Tsirkin (10) Patent No.: US 11,036,645 B2
(45) Date of Patent: Jun. 15, 2021

(54) SECURE USERSPACE NETWORKING FOR GUESTS

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 158 days.

(21) Appl. No.: 15/998,887

(22) Filed: Aug. 16, 2018

(65) Prior Publication Data

US 2019/0391927 A1    Dec. 26, 2019

Related U.S. Application Data

(60) Provisional application No. 62/690,104, filed on Jun. 26, 2018.

(51) Int. Cl.
*G06F 12/00* (2006.01)
*G06F 12/1009* (2016.01)
*G06F 9/455* (2018.01)

(52) U.S. Cl.
CPC ...... *G06F 12/1009* (2013.01); *G06F 9/45545* (2013.01); *G06F 9/45558* (2013.01); *G06F 2009/45583* (2013.01); *G06F 2212/651* (2013.01)

(58) Field of Classification Search
None
See application file for complete search history.

(56) References Cited

U.S. PATENT DOCUMENTS

| | | | |
|---|---|---|---|
| 9,424,199 B2 * | 8/2016 | Kegel | G06F 12/1009 |
| 2013/0145055 A1 | 6/2013 | Kegal et al. | |
| 2014/0040440 A1 * | 2/2014 | Christopher | H04L 61/6022 709/220 |
| 2017/0199827 A1 | 7/2017 | Sankaran et al. | |
| 2018/0088987 A1 | 3/2018 | Li et al. | |
| 2018/0136868 A1 * | 5/2018 | Tsirkin | G06F 13/16 |
| 2019/0347125 A1 * | 11/2019 | Sankaran | G06F 9/4881 |

FOREIGN PATENT DOCUMENTS

WO    2017049590    3/2017

OTHER PUBLICATIONS

I/O Page Faults by Ilya Lesokhin; Technicon—Computer Science Department—M.Sc. Thesis MSC-2015-21—2015; Nov. 2015; (85 pages).
IoMmu model / Microsoft Docs; Nathan Bazan; Apr. 20, 2017 (pp. 1-2).
Shared Virtual Memory Virtualization by Yi L. Liu; Ashok Ray and Jacob Pan; Intel Open Source Technology Center; https://pdfs.semanticscholar.org/presentation/1b5b/583986ad6b003edfa1e86f41f760f138a442.pdf; 2017; retrieved Jun. 6, 2018 (pp. 1-31).
IOMMU driver support for shared virtual memory virtualization [LWN.net] by Jacob Pan; https://lwn.net/Articles/726606/; Jun. 27, 2017I retrieved Aug. 16, 2018 (2 pages).

* cited by examiner

*Primary Examiner* — Midys Rojas
(74) *Attorney, Agent, or Firm* — K&L Gates LLP (57) ABSTRACT

Secure userspace networking for guests is disclosed. For example, a memory is associated with a guest, which is associated with a virtual device. A hypervisor associated with the guest executes on a processor to map a queue associated with the virtual device to an address space identifier. A request associated with the queue is detected. A page table associated with the virtual device is located based on the address space identifier. The request is translated with the first page table yielding a memory address of a message.

20 Claims, 7 Drawing Sheets

SECURE USERSPACE NETWORKING FOR GUESTS

CROSS REFERENCE TO RELATED APPLICATION

The present application is a non-provisional of U.S. Provisional Application Ser. No. 62/690,104, filed Jun. 26, 2018, the entire disclosure of which is hereby incorporated by reference herein.

BACKGROUND

The present disclosure generally relates to virtualized computer systems. For scalability and efficiency reasons, many computer systems employ virtualized guests such as virtual machines and containers to execute computing tasks performed by the computing systems, such as for hosting application programs. Typically, guests such as containers and virtual machines may be launched to provide extra compute capacity of a type that the guest is designed to provide, while isolating compute resources used by different users and tenants away from those of other users. Guests enable a programmer to quickly scale the deployment of applications to the volume of traffic requesting the applications, and they may be deployed in a variety of hardware environments. Multiple guests may also be clustered together to perform a more complex function than the respective containers are capable of performing individually. To interact with a broader set of users and a broader computing ecosystem, guests typically employ virtualized devices such as input/output ("I/O") devices controlled by drivers, including virtualized network interfaces.

SUMMARY

The present disclosure provides a new and innovative system, methods and apparatus for secure userspace networking for guests. In an example, a memory is associated with a guest, which is associated with a virtual device. A hypervisor associated with the guest executes on one or more processors to map a queue associated with the virtual device to an address space identifier. A request associated with the queue is detected. A page table associated with the virtual device is located based on the address space identifier. The request is translated with the first page table yielding a memory address of a message.

Additional features and advantages of the disclosed method and apparatus are described in, and will be apparent from, the following Detailed Description and the Figures.

DETAILED DESCRIPTION OF EXAMPLE EMBODIMENTS

In many computer systems, physical hardware may host guests such as virtual machines and/or containers. In an example, a virtual machine ("VM") may be a robust simulation of an actual physical computer system utilizing a hypervisor to allocate physical resources to the virtual machine. In sharing physical computing resources, guests and/or a hypervisor controlling them, may also have access to shared components of the underlying host, for example, I/O devices (e.g., network interface cards ("NICs"), storage controllers, USB controllers, PS2 interfaces, etc.). However, such access is typically restricted through a virtualization manager such as a hypervisor to ensure that virtual environments remain segregated and to prevent unauthorized access to other virtual environments on the same host, or to the host itself. In many cases, direct access to physical hardware, including physical I/O devices and memory, may be configured to require elevated access to prevent security risks from giving unprivileged guest components access to these physical components. For example, with rights to directly manipulate memory, a malicious user with unprivileged user access to a system may be able to read the data of other accounts and/or execute destructive or other malicious code.

In typical computer systems, there may be more data referenced by executing applications (both applications executing on physical hardware and those in virtualized guests on the physical hardware) than there is memory available on the system. Typically, memory virtualization is implemented to allow memory to be shared among these various processes. For example, data may be loaded to memory when it is needed for a program to execute, and then moved to slower storage such as hard disk when the data is not being accessed. In an example, memory paging is implemented to track the virtual addresses of the data of executing applications. A given memory address may be referenced by any number of virtual addresses. Page tables that perform lookups to translate between virtual and memory addresses may be implemented with granular access controls, such that a given execution context may access only those memory locations that it has permission to access based on those memory locations being available for translation in a corresponding page table.

The present disclosure provides limited direct access to I/O devices such as network interfaces for guest applications, while protecting against malicious and/or unintended access by unprivileged guest applications to memory locations these unprivileged guest applications would not otherwise have access to. In an example, a virtual guest may include a virtual device (e.g., virtual NIC ("VNIC")) including a VNIC driver on a guest operating system of the virtual guest. A guest operating system may reserve a section of memory for the VNIC operation (e.g., memory reserved by a virtual device driver). Unprivileged guest components (e.g., applications) are given access to respective portions of this device memory through page tables that these unprivileged guest components have access to, which may be a queue for requests from the application to the device. These respective page tables may be identified with an address space identifier associated with the respective unprivileged guest components. The hypervisor detects that a request is written to a queue in device memory, the queue being associated with an address space identifier. The request is then translated by the hypervisor with the corresponding page table sharing the same address space identifier to yield the memory address of the message or instructions from the application stored in the application's memory. During page table translation, access rights to the memory corresponding to a given page table entry are validated, thereby preventing unauthorized access. These access permissions are based on access level flags for read, write, and execute permissions associated with a given page table entry that a hypervisor or other memory manager verifies against access permissions of the requestor of the translated memory address. By providing a channel through which guest applications may directly access isolated and restricted portions of device memory, access latency for such operations may be reduced by up to 30%, resulting in significant performance improvements for I/O operations such as network transmission requests and hard disk read/write operations for unprivileged virtualized guest components.

Figure 1:
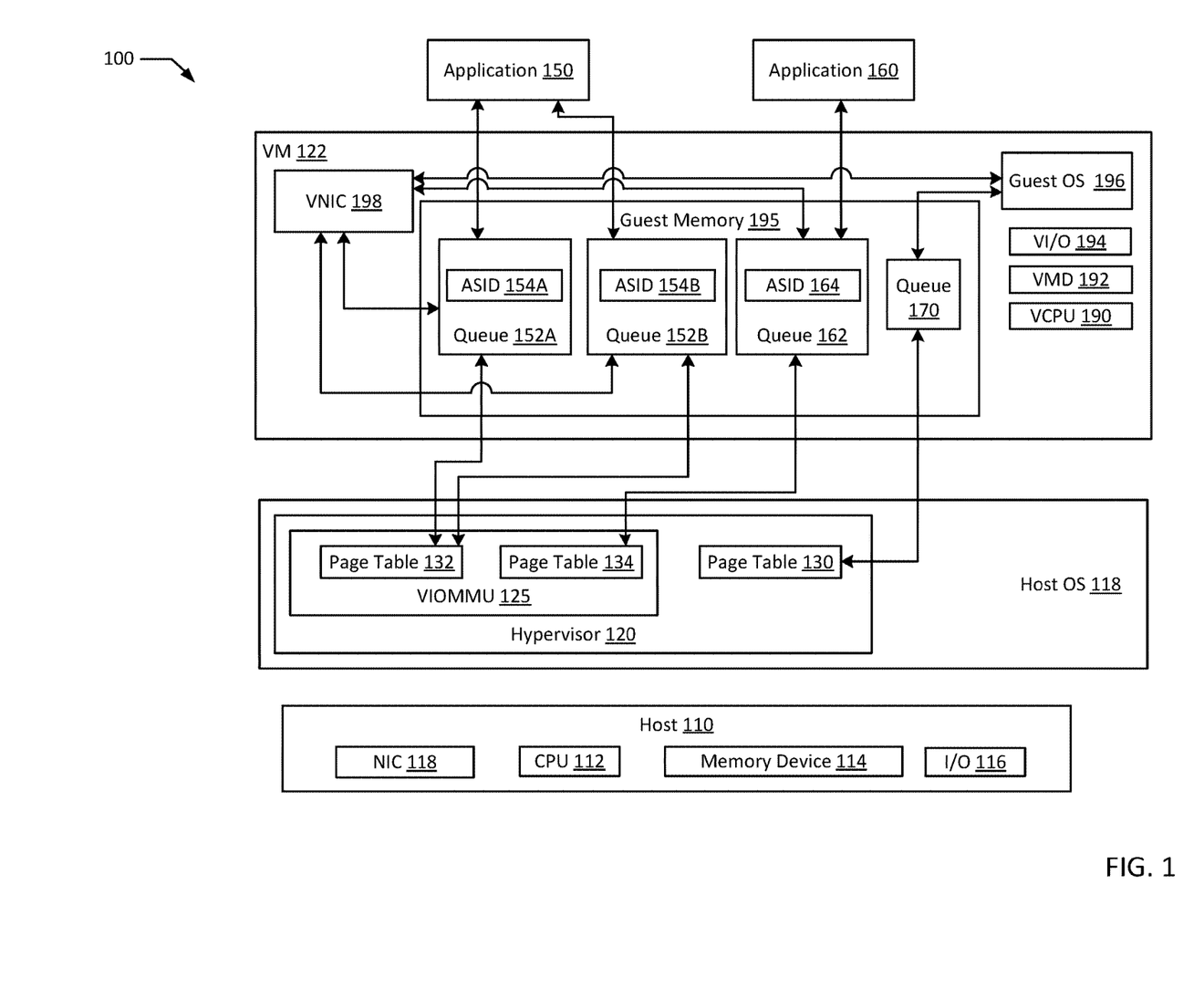
FIG. 1 is a block diagram of a system implementing secure userspace networking for guests according to an example of the present disclosure.

FIG. 1 is a block diagram of a system implementing secure userspace networking for guests according to an example of the present disclosure. The system 100 may include one or more host(s) 110. Host 110 may in turn include one or more physical processor(s) (e.g., CPU 112) communicatively coupled to memory device(s) (e.g., MD 114) and input/output device(s) (e.g., I/O 116). As used herein, physical processor or processors 112 refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory device 114 refers to volatile or non-volatile memory devices, such as RAM, ROM, EEPROM, or any other device capable of storing data. As discussed herein, I/O device(s) 116 refer to devices capable of providing an interface between one or more processor pins and an external device, the operation of which is based on the processor inputting and/or outputting binary data. CPU(s) 112 may be interconnected using a variety of techniques, ranging from a point-to-point processor interconnect, to a system area network, such as an Ethernet-based network. Local connections within host 110, including the connections between processor 112 and a memory device 114 and between processor 112 and I/O device 116 may be provided by one or more local buses of suitable architecture, for example, peripheral component interconnect (PCI).

In an example, host 110 may host one or more guests, for example, VM 122 and/or additional VMs. In an example, VM 122 may be a VM executing on host 110. In an example, a container may execute on VM 122. In addition, VMs may further host other guests necessary to execute their configured roles (e.g., a nested hypervisor or nested containers). For example, a VM (e.g., VM 122) may further host a Java® Virtual Machine ("JVM") if execution of Java® code is necessary.

System 100 may run one or more VMs (e.g., VM 122), by executing a software layer (e.g., hypervisor 120) above the hardware and below the VM 122, as schematically shown in FIG. 1. In an example, the hypervisor 120 may be a component of respective host operating system 118 executed on host 110. In another example, the hypervisor 120 may be provided by an application running on host operating system 118. In an example, hypervisor 120 may run directly on host 110 without an operating system beneath hypervisor 120. Hypervisor 120 may virtualize the physical layer, including processors, memory, and I/O devices, and present this virtualization to VM 122 as devices, including virtual central processing unit ("VCPU") 190, virtual memory devices ("VMD") 192, virtual input/output ("VI/O") device 194, and/or guest memory 195. In an example, a physical I/O device (e.g., I/O 116) may be virtualized to provide the functionality of the physical device to a virtual guest. For example, hypervisor 120 virtualizes I/O 116 as virtual network interface card ("VNIC") 198. In an example, hypervisor 120 may host a virtual IO memory management unit ("VIOMMU") 125 to manage memory access for VNIC 198. In an example, VIOMMU 125 may execute independently, as part of host OS 118, as part of hypervisor 120, or within a virtualized guest (e.g., VM 122). In an example, a VM 122 may be a virtual machine and may execute a guest operating system 196 which may utilize the underlying VCPU 190, VMD 192, and VI/O 194. Processor virtualization may be implemented by the hypervisor 120 scheduling time slots on physical processors 112 such that from the guest operating system's perspective those time slots are scheduled on a virtual processor 190.

VM 122 may run on any type of dependent, independent, compatible, and/or incompatible applications on the underlying hardware and host operating system 118. In an example, a container or application (e.g., applications 150, 160) running on VM 122 may be dependent on the underlying hardware and/or host operating system 118. In another example, a container or application (e.g., applications 150, 160) running on VM 122 may be independent of the underlying hardware and/or host operating system 118. In an example, a container or application (e.g., applications 150, 160) running on VM 122 may be compatible with the underlying hardware and/or host operating system 118. Additionally, a container or application (e.g., applications 150, 160) running on VM 122 may be incompatible with the underlying hardware and/or OS. The hypervisor 120 may manage memory for the host operating system 118 as well as memory allocated to the VM 122 and guest operating system 196 such as guest memory 195 provided to guest OS 196.

In an example, any form of suitable network for enabling communications between computing devices, for example, a public network (e.g., the Internet), a private network (e.g., a local area network (LAN) or wide area network (WAN)), or a combination thereof may be employed to connect host 110, VM 122, and/or to other computer systems. In an example, VNIC 198 provides an interface between VM 122 and a network VM 122 is connected to. In an example, one or more page tables (e.g., page tables 130, 132, 134) may provide translation for virtual addresses (e.g., via page table entries) to memory addresses in memory device 114. In the example, VIOMMU 125 and/or hypervisor 120 may provide an interface between page tables 130, 132, 134 and memory device 114. In an example, VIOMMU 125 and/or hypervisor 120 may further provide an interface between virtual memory devices (e.g., guest memory 195, VMD 192) and memory device 114.

In an example, VNIC 198 is allocated a section of memory in memory device 114 by guest OS 196 as device memory for VNIC 198, and this section of memory is also virtualized in guest memory 195. In the device memory, guest OS 196, VNIC 198, and/or a driver of VNIC 198 allocates certain memory addresses as workload queues (e.g., queues 152A, 152B, 162). In an example, each queue may be configured to provide a location into which workload requests may be stored, by either unprivileged guest components (e.g., applications 150, 160), or privileged guest components (e.g., guest OS 196). In an example, queues associated with unprivileged guest components (e.g., queues 152A-B associated with application 150, and queue 162 associated with application 160) may further be associated with an address space identifier ("ASID") (e.g., ASIDs 154A, 154B, 164). In an example, each unprivileged guest component (e.g., application 150 or 160) may be associated with an ASID (e.g., application 150 with ASID 154A-B, which may be the same ASID; application 160 with ASID 164). In an example, multiple unprivileged guest components with the same or similar execution permissions may share an ASID. In an example, each ASID (e.g., ASID 154A-B or ASID 164) may be associated with a respective page table (e.g., page table 132 or page table 134).

In an example, hypervisor 120 and/or VIOMMU 125 is configured to detect requests being stored to the physical and/or virtual memory addresses associated with queues 152A-B and to take such requests and translate a virtual memory address included with the request with corresponding page table 132 to retrieve a request payload (e.g., a message for transmission) stored in the unprivileged guest component memory space of application 150. In an example, application 160 may store requests in queue 162 to be translated by page table 134 based on ASID 164. In an example, guest OS 196 may interface directly with VNIC 198. In an example, guest OS 196 may store requests in device memory associated with queue 170, which is unassociated with any ASID, and these requests may be translated by page table 130, which may be identified by hypervisor 120 based on a bus identifier, a device identifier, and/or a function identifier associated with VNIC 198 and page table 130. In an example, functionality of VNIC 198 accessible through queues 152A-B and 162 may be more limited than the functionality accessible through queue 170. For example, queuing messages for transmission may be enabled by queues 152A-B and 162, but reconfiguring networking settings (e.g., ports, firewalls, etc.) may not be enabled. In an example, applications 150 and/or 160 are required to request guest OS 196 to perform restricted operations on VNIC 198.

Figure 2:
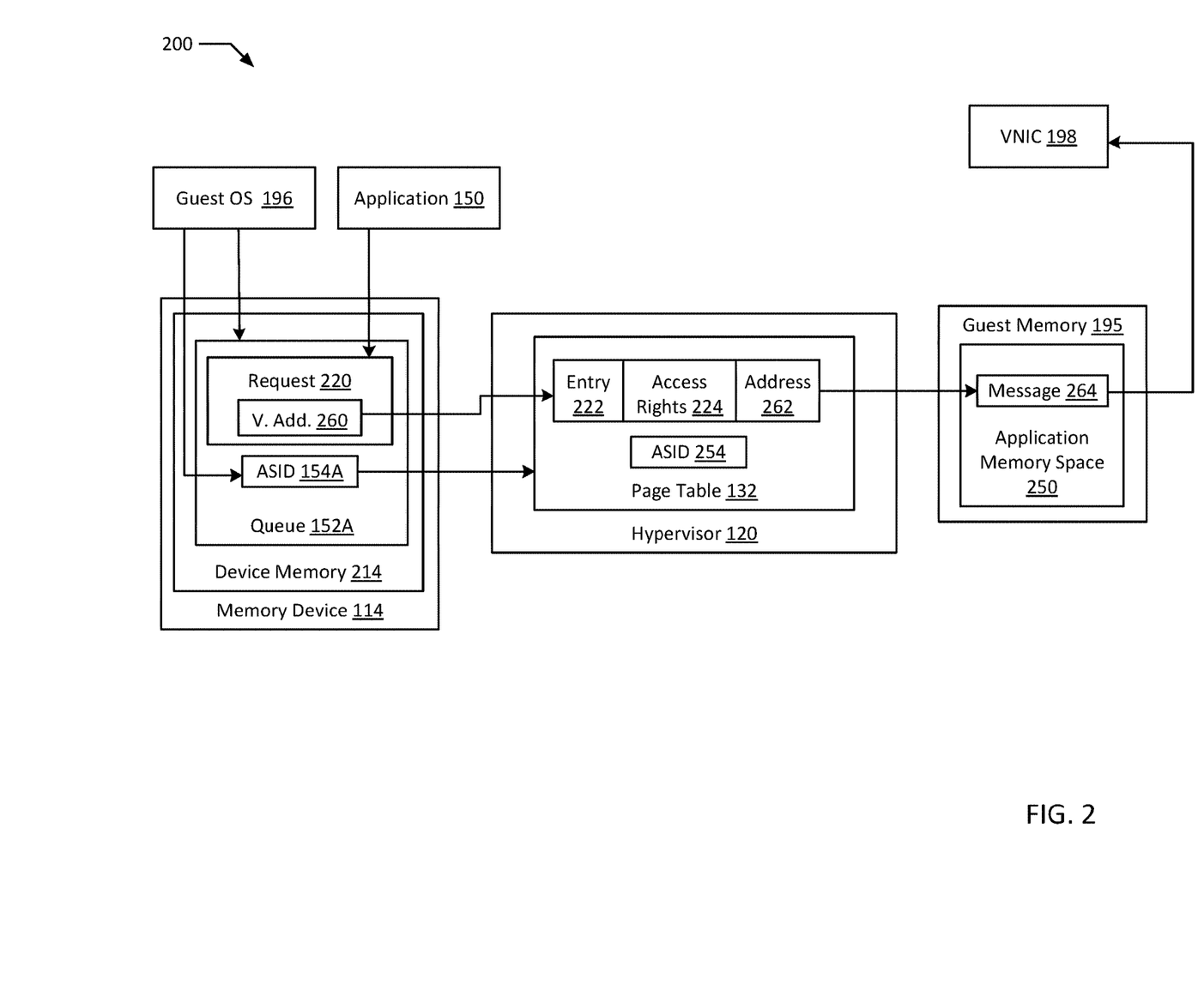
FIG. 2 is a block diagram illustrating a system implementing secure userspace networking for guests handling a request from an unprivileged application in a guest according to an example of the present disclosure.

FIG. 2 is a block diagram illustrating a system implementing secure userspace networking for guests handling a request from an unprivileged application in a guest according to an example of the present disclosure. In an example, system 200 illustrates application 150 transmitting a message out of VNIC 198 by using hypervisor 120. In the example, application 150 is launched in guest OS 196 and application 150 is an unprivileged guest component configured to require access to transmit messages out of VM 122 over a network. In an example, VNIC 198 is a virtual network interface of VM 122. In the example, when VNIC 198 was instantiated (e.g., at bootup time for VM 122 and guest OS 196), hypervisor 120 allocated a portion of the memory addresses in memory device 114 as device memory 214 of VNIC 198. In an example, part of device memory 214 is further subdivided into multiple queues for queuing requests to VNIC 198, including queue 152A. In an example, some of these queues are associated with ASIDs (e.g., ASID 154A), which may be used to effectively correlate a request with a requestor of the request, and thus memory access permissions for the requestor. For example, an identifying metadata header of queue 152A may include ASID 154A. In an example, the identifying metadata header of queue 152A additionally includes bus, device, and/or function identifiers of VNIC 198. In the illustrated example of system 200, upon launching application 150, guest OS 196 requests that application 150 be granted access to the memory locations of queue 152A (e.g., via hypervisor 120). For example, application 150 may have access to a virtual address of queue 152A that is translated by a page table associated with application 150 to the physical address of queue 152A. Therefore, application 150, an unprivileged component of VM 122, has direct access to device memory 214.

In an example, application 150 triggers request 220 by manipulating memory associated with queue 152A. For example, request 220 may be a work order stored in a memory address associated with the device memory of VNIC 198 that corresponds to queue 152A, with the work order including a virtual address 260 of the actual request payload (e.g., message to be transmitted, transmission instructions, etc.) from application 150. In an example, the payload is separately stored in memory allocated to application 150, for example, because the allocated memory capacity of queue 152A is limited. In an example, hypervisor 120 and/or VIOMMU 125 detects the write in device memory 214 and retrieves the virtual address 260 in request 220. Based on request 220 being stored in memory associated with queue 152A, which is associated with ASID 154A, hypervisor 120 selects page table 132 to translate virtual address 260. For example, page table 132 is associated with ASID 254, the same ASID as ASID 154A. In an example, virtual address 260 corresponds to page table entry 222, which corresponds to address 262. In an example, hypervisor 120 verifies, based on access rights 224, that physical address 262 is permissioned to be accessible to application 150. For example, page table entry 222 associated with virtual address 260 in request 220 may include one or more flags delineating read, write, and/or execute permissions on the data in address 262. In an example, if the request is rejected by checking access rights 224, a page fault or other memory error may be generated and sent to application 150 and/or guest OS 196. In an example, such a memory access error may cause unpredictable behavior such as a crash in application 150. In an example where application 150 has proper access to address 262, which is determined to be in an application memory space 250 of application 150 stored in guest memory 195, a message 264 is retrieved from address 262 and hypervisor 120 transmits the message (e.g., via I/O 116).

Figure 3:
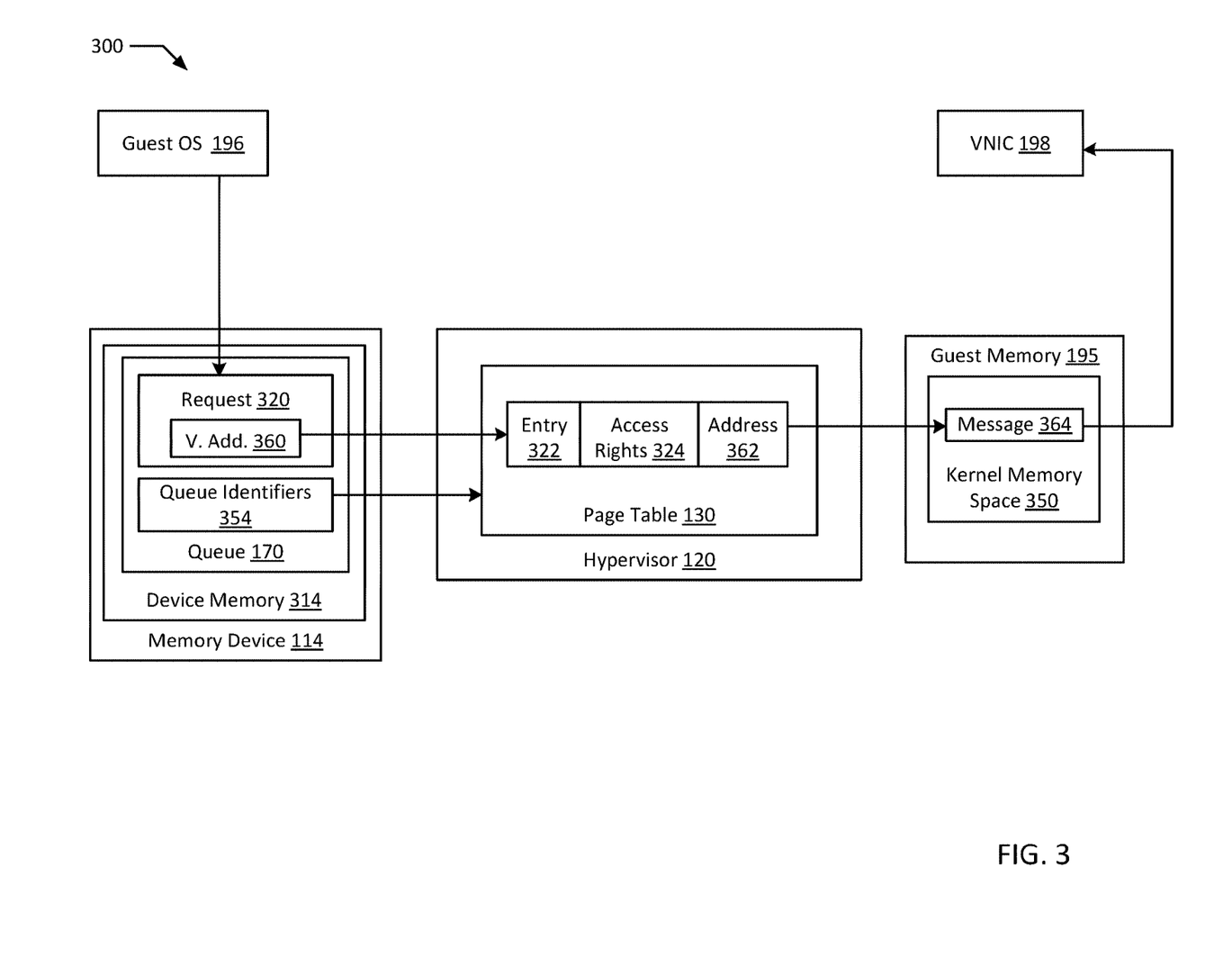
FIG. 3 is a block diagram illustrating a system implementing secure userspace networking for guests handling a request from a privileged kernel of a guest according to an example of the present disclosure.

FIG. 3 is a block diagram illustrating a system implementing secure userspace networking for guests handling a request from a privileged kernel of a guest according to an example of the present disclosure. In an example, system 300 illustrates guest OS 196 (e.g., a privileged guest component of VM 122) directly accessing VNIC 198. In the example, guest OS 196 is also provided access to a portion of the device memory of VNIC 198 (e.g., device memory 314). In an example, device memory 314 and device memory 214 are not contiguous with each other. In an example, application 150 may not have access to device memory 314 and/or queue 170. In an example, guest OS 196 stores request 320 with virtual address 360 in queue 170. In the example, by accessing a virtual address associated with queue 170's physical address in memory device 114, guest OS 196, a privileged component of VM 122, triggers request 320. In an example, hypervisor 120 detects request 320 based on a memory location associated with the VNIC 198 (e.g., a location within device memory 314) and unassociated with any ASID being accessed.

In an example, queue 170 (and therefore request 320) lacks association with any ASID associated with VNIC 198, but queue 170 is associated with one or more other identifiers, for example, a bus identifier associated with VNIC 198, a device identifier of VNIC 198, and/or a function identifier associated with VNIC 198, and at least one of these identifiers is shared by page table 130 that allows hypervisor 120 to identify page table 130 as the proper page table with which to translate virtual address 360. In an example, virtual address 360 corresponds to page table entry 322, and after verifying that the kernel of guest OS 196 has access to memory address 362 (e.g., by validating access rights 324), message 364 is retrieved from kernel memory space 350 of guest memory 195. In an example, message 364 may be an OS message sent to host 110, or a virtualization orchestrator. In another example, message 364 may be a command to VNIC 198, for example, to reserve and/or associate a new application 160 with queue 162.

Figure 4:
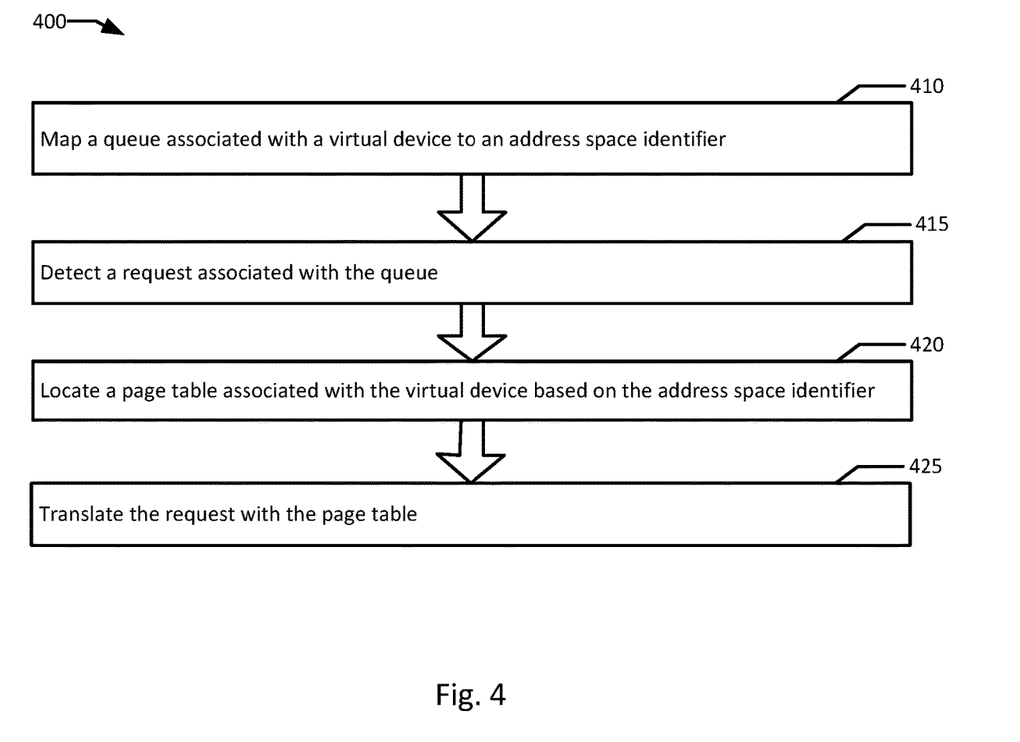
FIG. 4 is a flowchart illustrating an example of secure userspace networking for guests according to an example of the present disclosure.

FIG. 4 is a flowchart illustrating an example of a secure userspace networking for guests according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by a hypervisor 120, which includes a virtual I/O memory management unit ("VIOMMU") 125.

Example method 400 may begin with mapping a queue associated with a virtual device to an address space identifier, wherein the device is associated with a guest (block 410). In an example, hypervisor 120 maps queue 152A associated with VNIC 198 of VM 122 to ASID 154A. In an example, after being mapped to ASID 154A, a metadata header of queue 152A includes ASID 154A. In an example, queue 152A is associated with ASID 154A based on hypervisor 120 receiving a notice (e.g., from guest OS 196) identifying queue 152A based on one or more of a bus attribute, a device attribute, and/or a function attribute associated with VNIC 198 and/or queue 152A. In the example, the notice includes ASID 154A and instructions to associate queue 152A with ASID 154A.

In an example, queue 152A is one queue out of a plurality of queues associated with VNIC 198. In an example, VNIC 198 may be configured with a portion of its device memory (e.g., device memory 214, 314) reserved as queues (e.g., queues 152A-B, 162, 170) for accepting instructions from various privileged (e.g., guest OS 196) and unprivileged (e.g., applications 150, 160) components of VM 122. In an example, multiple queues (e.g., queues 152A-B) may be associated with the same ASID (e.g., ASID 154A-B). In such examples, each queue (e.g., queues 152A-B) associated with a given ASID (e.g., ASID 154A) may have requests placed on the queue translated by a shared page table 132 associated with that ASID 154A-B. In an example, multiple queues allows for parallel processing and/or prioritization of messages. For example, queue 152A may be a high priority queue where new requests are immediately notified to hypervisor 120 and processed as interrupts, while queue 152B may be a low priority queue that is scanned for new requests periodically by hypervisor 120, for example, once every 10 seconds. In another example, queues 152A and 152B may have similar prioritization, but the two queues may have requests processed during an overlapping timeframe by different threads or cores of CPU 112, thereby increasing processing throughput.

A request associated with the queue is detected (block 415). In an example, hypervisor 120 detects request 220 based on the memory location of queue 152A being accessed. In the example, page table 132 associated with application 150 has a page table entry for a virtual address for a transmission queue of application 150, that translates to a memory address of queue 152A in device memory 214. In the example, hypervisor 120 detects that device memory 214 is accessed, and then validates that the accessed memory location corresponds to queue 152A. In an example, page table 132 is associated with VIOMMU 125.

A page table associated with the virtual device is located based on the address space identifier (block 420). In an example, hypervisor 120 inspects the header of queue 152A, and identifies that queue 152A is associated with ASID 154A. In the example, due to queue 152A being associated with an ASID (e.g., ASID 154A), hypervisor 120 identifies that the proper page table (e.g., page table 132) with which to translate virtual address 260 of request 220 is a page table associated with VIOMMU 125. Page table 132 is then identified as the page table to use to translate virtual address 260 based on page table 132 being associated with ASID 254, the same ASID as ASID 154A. In an example, when application 150 added request 220 to queue 152A, it also stored a request payload (e.g., message 264 to be transmitted) in another memory address in its application memory space 250.

The request is translated with the page table (block 425). In an example, translating the request 220 yields a memory address of message 264. In an example, translating request 220 includes using page table 132 to translate virtual address 260 into address 262 of message 264 in application memory space 250. In an example, address 262 is a memory address and application memory space 250 is a block of memory allocated to application 150.

In various other examples, a virtual IOMMU (e.g., VIOMMU 125) may be implemented recognizing the association between ASID, page table, and memory locations of queues that may then perform translation of direct requests between unprivileged guest components (e.g., applications 150 and 160) and a virtual device (e.g., VNIC 198). The virtual device and hypervisor 120 would then handle interpreting the relevant instructions for the physical I/O device 116. For example, as long as VIOMMU 125 recognizes a write of request 220 to a memory address of queue 152A, the request can be handled without application 150 requesting the kernel (e.g., guest OS 196) to handle its message transmission request. This in turn prevents a context switch and the associated computing overhead of the context switch, which advantageously improves processing speed and cache memory efficiency, thereby increasing overall computing efficiency and throughput. Also advantageously improved is the execution speed for requests through these channels, reducing effective response times to networking requests.

In an example, for added security, any transmissions made through direct access to VNIC 198's device memory (e.g., through queues 154A-B, 164, and/or 170) may have a MAC address or other identifying metadata associated with the message verified by VNIC 198 and/or guest OS 196 prior to transmission to verify the origin of the message. For example, any new route to access memory may present potential avenues for unknown future exploits. As a partial mitigation, a transmission request may first be validated as actually originating from VM 122 and/or application 150 or 160. In addition, messages may be labeled to be easily identifiable so that once a downstream unwanted effect is noticed based on messages originating from VNIC 198 (e.g., spam, DDOS attack, etc.), VNIC 198 may be configured to shut down the unwanted message stream. For example, such messages may also be tagged with a sender identification tag (e.g., of guest OS 196 and/or VNIC 198) so that the message may easily be traced back to its sender. These contingencies may be used to identify unwanted messages (e.g., spam, denial of service attacks, etc.) originating from applications 150 and/or 160 executing on VM 122, and thereby allow for fast remediation of these unwanted transmissions. For example, a recipient of unwanted messages may be configured to respond with a stop request to VNIC 198 that disables messages from an identified source.

In an example, application 150 is one of several applications (e.g., belonging to the same user account) with access to queues 152A-B and page table 132. In an example, application 160 has different execution permissions from application 150 and is associated with separate queue 162 and separate page table 134, thereby allowing VIOMMU 125 and/or hypervisor 120 to use memory access controls in page tables 132 and 134 to restrict application 150 and application 160 from accessing each other's memory space. In an example, ASIDs 154A-B may be the same ASID while ASID 164 may be a different ASID. In an example, application 160 may be restricted from accessing page table 132 and/or queues 152A-B. In an example, queues 152A-B may be outside of the memory addresses addressable by application 160. For example, page table 134 associated with application 160 may lack any page table entry that translates to the memory of queues 152A-B. In an example, if application 160 attempted to access address 262, such access attempt would be denied by a verification against access rights 224.

Figure 5:
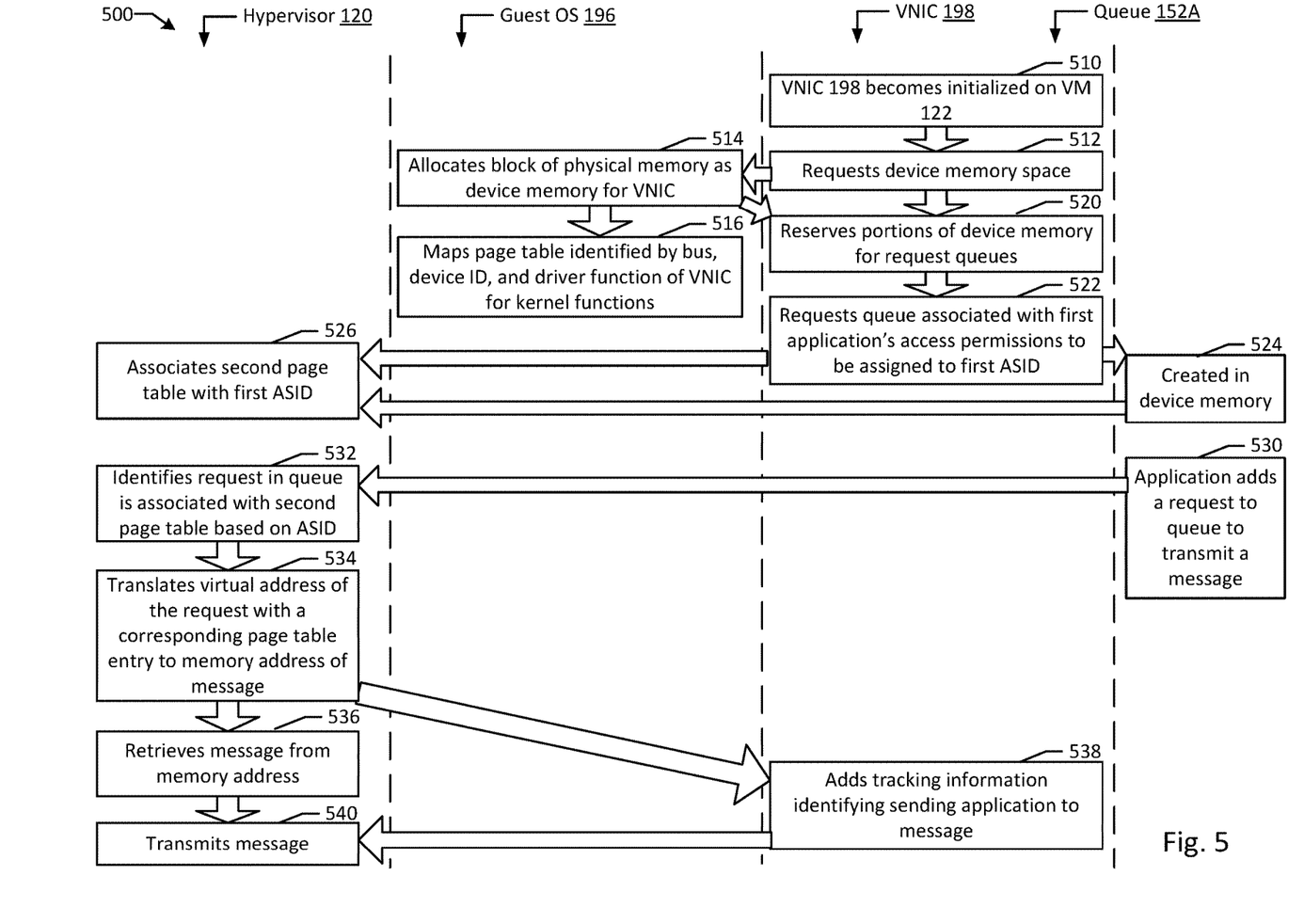
FIG. 5 is flow diagram of an example of secure userspace networking for guests according to an example of the present disclosure.

FIG. 5 is flow diagram of an example of secure userspace networking for guests according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, hypervisor 120, queue 152A, and VNIC 198 execute to handle a message transmission requests associated with application 150.

In example system 500, in an example, VNIC 198 is initialized in VM 122 (block 510). In the example, VNIC 198 requests the creation of a device memory space (e.g., device memory 214) (block 512). In an example, a guest OS 196 may pass the request on to hypervisor 120. In an example, guest OS 196 allocates a block of memory in memory device 114 as device memory 214 for VNIC 198 (block 514). In the example, guest OS 196 may, after allocating device memory 214, instantiate a page table 130 identified by a bus ID, device ID, and driver function name of VNIC 198 for kernel restricted privileged functions of VNIC 198 (block 516).

In an example, VNIC 198 reserves a portion of device memory 214 for queues for requests (block 520). In an example, the memory locations of the queues are reserved against VNIC 198 storing its own operational data into those memory locations. In various examples, guest OS 196 may also reserve and/or assign queues to applications and/or ASIDs. In an example VNIC 198 (e.g., a driver of VNIC 198 on guest OS 196) requests a first reserved queue to be associated with application 150's access permissions by, for example associating the reserved queue 152A and a page table associated with application 150 (e.g., page table 132) both to ASID 154A (block 522). In an example, queue 152A is created in device memory 214 (e.g., by converting a reserved queue into an active queue) (block 524). In an example, hypervisor 120 associates page table 132 with ASID 154A (block 526).

In an example, application 150 adds request 220, a request to transmit a message, to queue 152A (block 530). In an example, hypervisor 120 identifies that request 220 is translatable by page table 132 based on page table 132 and queue 152A sharing an association with ASID 154A, for example, by inspecting a header of queue 152A (block 532). In an example, hypervisor 120 translates virtual address 260 included in the request into address 262 of message 264 with page table entry 222 (block 534). In an example, hypervisor 120 retrieves message 264 from memory address 262 (block 536). In the example, VNIC 198 adds tracking information identifying that the message 264 is being sent by application 150 on guest OS 196 (block 538). In an example, hypervisor 120 transmits message 264 to a destination (block 540).

Figure 6:
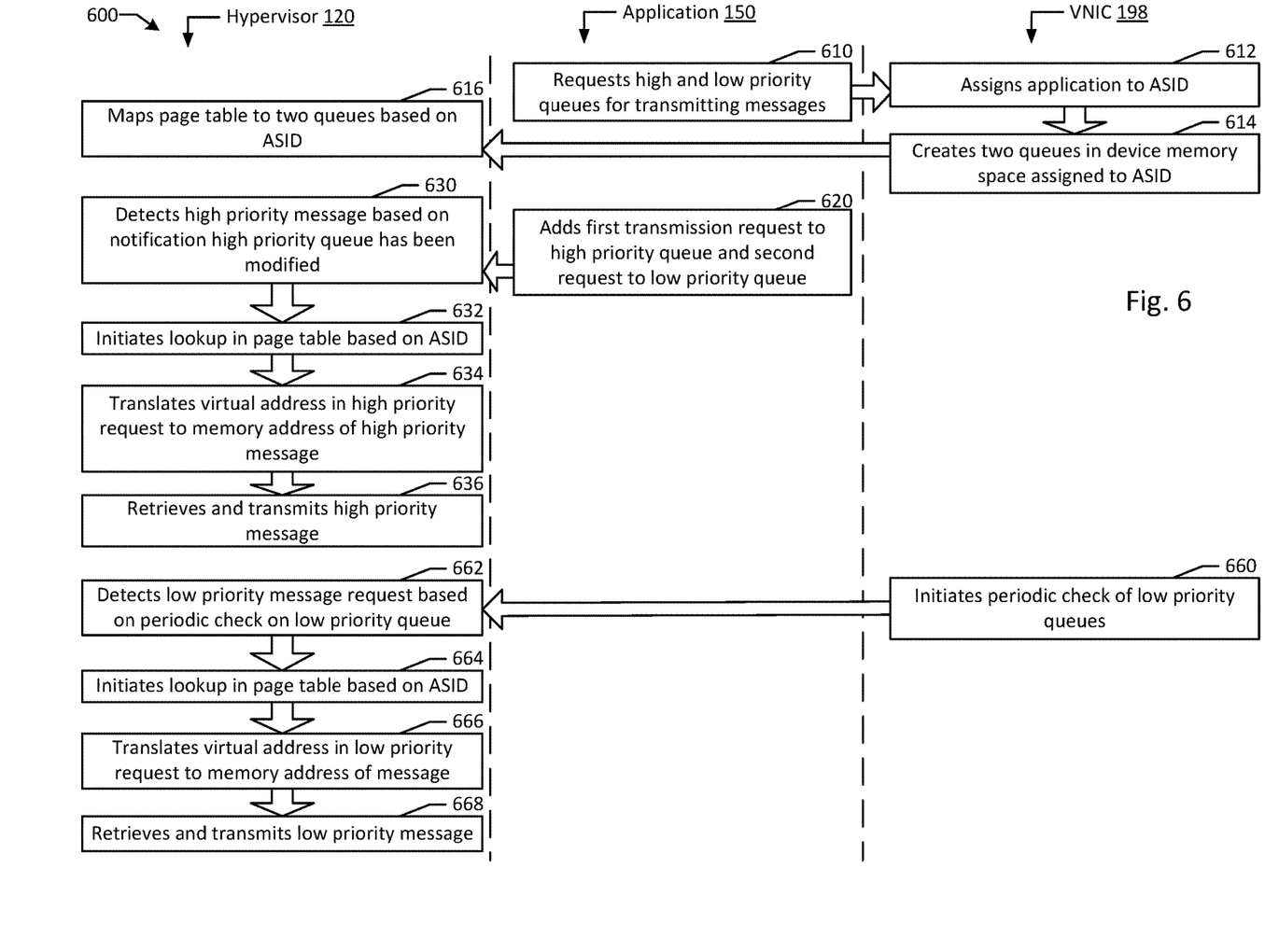
FIG. 6 is flow diagram of an example of a secure userspace networking for guests implementation with request prioritization according to an example of the present disclosure.

FIG. 6 is flow diagram of an example of a secure userspace networking for guests implementation with request prioritization according to an example of the present disclosure. Although the examples below are described with reference to the flowchart illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, hypervisor 120, application 150 and VNIC 198 execute to handle message transmission requests of different priorities from application 150.

In example system 600, application 150, upon being launched, requests both high and low priority message transmission queues (block 610). In the example, VNIC 198 (e.g., a driver of VNIC 198 executing on guest OS 196) assigns application 150 to an unused ASID 154A (block 612). In an example, VNIC 198 then creates two queues in device memory 214 (e.g., queues 152A-B) and assigns them to ASID 154A-B (block 614). In an example, hypervisor 120 associates page table 132 with ASID 154A (block 616). For example, based on a notice from guest OS 196 identifying page table 132 that includes instructions to associate page table 132 with ASID 154A.

In an example, application 150 adds a first transmission request 220 to high priority queue 154A and a second low priority transmission request to low priority queue 154B (block 620). In the example, application 150 writes requests with virtual addresses of the message payloads of the transmission requests to respective queues 152A-B. In an example, hypervisor 120 detects that a high priority request for a high priority message has been added to queue 152A substantially immediately after application 150 adds request 220 to queue 152A, for example, based on receiving a notification of the memory location of queue 152A being modified (block 630). In an example, hypervisor 120 initiates a lookup for appropriate page table 132 based on ASID 154A associated with queue 152A (block 632). In an example, hypervisor 120 translates virtual address 260 in the high priority request 220 into address 262 of high priority message 264 (block 634). In the example, hypervisor 120 retrieves and transmits the high priority message 264 (block 636).

In an example, after a period of time, VNIC 198 requests a periodic check of its low priority queues (e.g., queue 152B) for messages to transmit, for example, based on the expiration of a timer (block 660). In the example, hypervisor 120 detects a low priority message request in queue 152B based on the periodic check (block 662). In the example, page table 132 is identified as the proper page table with which to translate a virtual address of the low priority message based on queue 152B being identified with ASID 154B (e.g., the same ASID as ASID 154A) (block 664). In an example, hypervisor 120 translates the virtual address in the low priority request to a memory address of the low priority message (block 666). In the example, hypervisor 120 retrieves the low priority message and transmits it (block 668).

Figure 7:
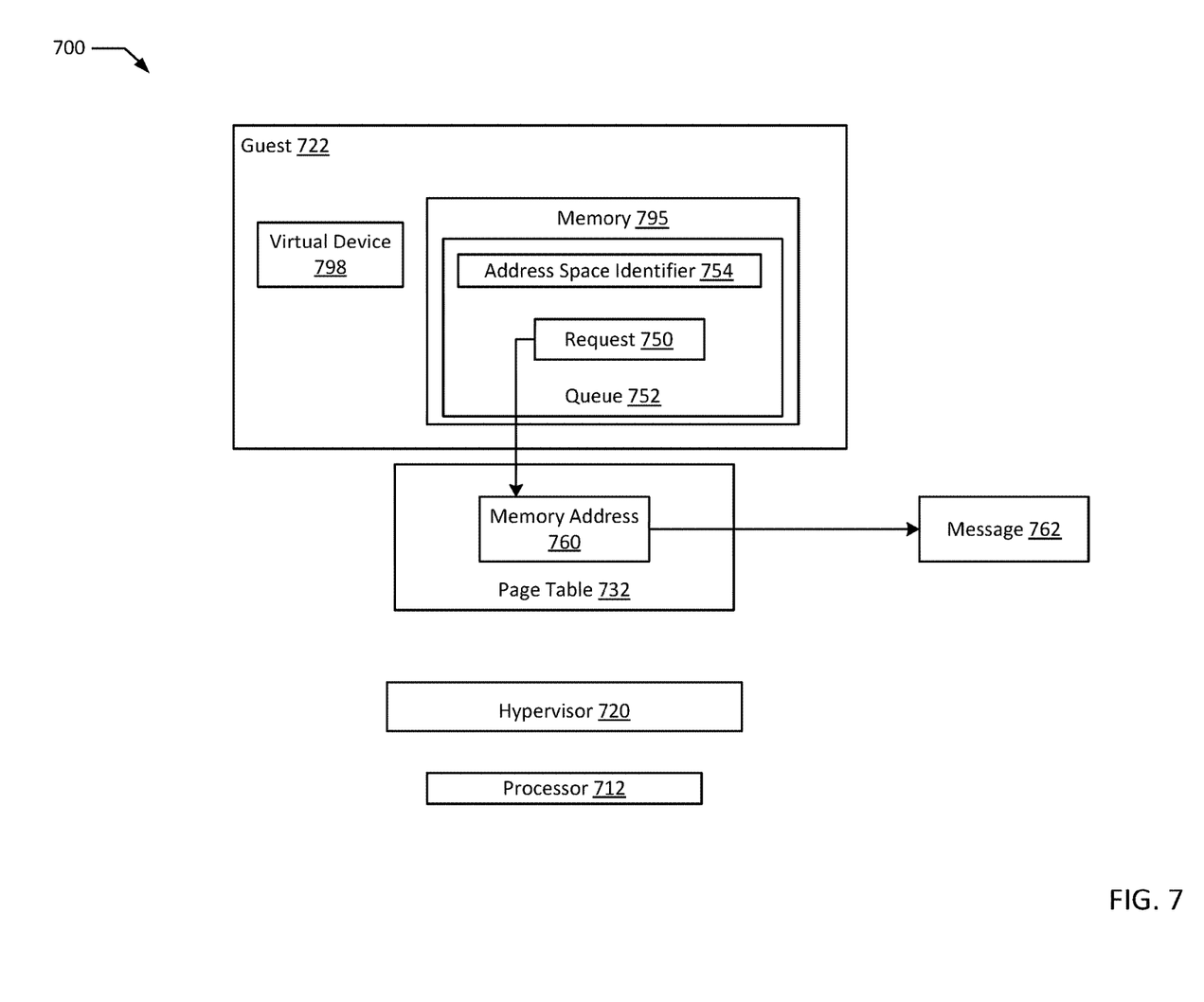
FIG. 7 is a block diagram of an example a system implementing secure userspace networking for guests according to an example of the present disclosure.

FIG. 7 is a block diagram of an example system implementing secure userspace networking for guests according to an example of the present disclosure. Example system 700 includes memory 795 associated with guest 722, where virtual device 798 is also associated with guest 722, and where guest 722 is further associated with a hypervisor 720. Hypervisor 720 executes on processor 712 to map queue 752 associated with virtual device 798 to address space identifier 754. Request 750 associated with queue 752 is detected. Page table 732 associated with virtual device 798 is located based on address space identifier 754. Request 750 is translated with page table 732, where translating request 750 yields memory address 760 of message 762.

Secure userspace networking for guests allows for a reduction in latency for unprivileged guest components accessing I/O devices by allowing these unprivileged guest components to have a secure location, like a secure drop box, in which requests to the I/O devices may be queued without necessitating elevated rights (e.g., a context switch to the kernel of the guest). Without the added security of segregated, access controlled page tables for different execution permissions associated with different unprivileged guest components, a direct access queue to an I/O device's memory space would be a potential target for security exploits. By having a virtual IOMMU validate that the memory access is legitimate in a translation step between request detection and payload execution, access is secured while incurring minimal overhead. For example, in any typical implementation, for a message stored in application memory by an application to be transmitted, the physical address of the message needs to be retrieved in order for a processor to prepare the message to be sent, which would be a similarly costly translation to the one performed in the present disclosure. Conveniently, such implementations do not require hardware support because a hypervisor may be configured to handle the memory management steps, and the physical I/O device does not need to be made aware of a source of any specific instruction from its virtualized counterpart. For example, a physical network card treats a request to transmit from a virtual network card the same regardless of whether the request originated form an unprivileged application or a privileged kernel of the guest hosting the virtual network card. Secure userspace networking for guests therefore allows for decreased latency for unprivileged networking requests in virtual guests, while still protecting against unauthorized memory access by unprivileged guest components. Thus, the present disclosure enhances the capabilities of hardware components in virtualized systems as described above.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a memory associated with a guest configured to execute on a virtual machine, wherein the virtual machine includes a virtual device and a plurality of unprivileged components including a first unprivileged component of the guest; and
   a hypervisor associated with the guest executing on one or more processors to:
      map a first queue associated with the virtual device to a first address space identifier of a plurality of address space identifiers, wherein each of the plurality of address space identifiers respectively identifies at least one memory address allocated as a respective workload queue, and each respective workload queue is allocated by the guest as device memory for the virtual device;
      detect a first request written by the first unprivileged component of the guest into the first queue;
      locate a first page table associated with the virtual device based on the first address space identifier; and
      translate the first request with the first page table, wherein translating the first request yields a memory address of a message.

2. The system of claim 1, wherein a second request to the virtual device lacks association with any address space identifier associated with the virtual device, and a second page table associated with a privileged component of the guest is located by the hypervisor based on at least one of a bus identifier associated with the virtual device, a device identifier of the virtual device, and a function identifier associated with the virtual device.

3. The system of claim 2, wherein the hypervisor detects the second request based on a memory location associated with the virtual device and unassociated with any address space identifier being accessed.

4. The system of claim 1, wherein a second request is associated with a second queue associated with a second address space identifier, and the second request is translated with a second page table associated the second address space identifier.

5. The system of claim 4, wherein a requestor of the second request is restricted from accessing at least one of the first queue and the first page table.

6. The system of claim 1, wherein translating the first request includes translating a virtual memory address included in the first request into the memory address of the message, and wherein the memory address of the message is associated with the first unprivileged component of the guest.

7. The system of claim 1, wherein a header of the first queue includes the first address space identifier.

8. The system of claim 1, wherein a first plurality of queues including the first queue is associated with a plurality of memory locations in the memory associated with the virtual device.

9. The system of claim 8, wherein the hypervisor locates the first queue based on a memory location of the plurality of memory locations being accessed by a component of the guest.

10. The system of claim 8, wherein a memory location of the plurality of memory locations is accessed, and the hypervisor validates the accessed memory location as matching a memory location of the first queue.

11. The system of claim 1, wherein a second queue is mapped to the first address space identifier and associated with the first page table.

12. The system of claim 1, wherein the first page table is associated with a virtual input output memory management unit.

13. The system of claim 1, wherein the first request is a request to transmit the message and the virtual device is a virtual network interface.

14. The system of claim 13, wherein a MAC address of the message is verified before the message is transmitted.

15. The system of claim 13, wherein the message is tagged with a sender identification tag.

16. The system of claim 1, wherein the first queue is associated with the first address space identifier based on the hypervisor receiving a notice identifying the first queue based on a queue identifier of the first queue from the guest, wherein the notice includes the first address space identifier.

17. The system of claim 1, wherein the hypervisor assigns the virtual device a plurality of memory addresses, and a privileged component of the guest associates a first virtual memory address associated with the first unprivileged component of the guest with a first memory address of the plurality of memory addresses.

18. The system of claim 17, wherein the first unprivileged component accessing the first virtual memory address triggers the first request; and
the privileged component accessing a second virtual memory address associated with a second memory address of the plurality of memory addresses triggers a second request translated by a second page table unassociated with any address space identifier.

19. A method comprising:
mapping a queue associated with a virtual device to an address space identifier of a plurality of address space identifiers, wherein a virtual machine includes the virtual device and a plurality of unprivileged components including a first unprivileged component of a guest, each of the plurality of address space identifiers respectively identifies at least one memory address allocated as a respective workload queue, and each respective workload queue is allocated by the guest as device memory for the virtual device;
detecting, by a hypervisor, a request written by the first unprivileged component of the guest into the queue;
locating, by the hypervisor, a page table associated with the virtual device based on the address space identifier; and
translating the request with the page table, wherein translating the request yields a memory address of a message.

20. A computer-readable non-transitory storage medium storing executable instructions, which when executed by a computer system, cause the computer system to:
map a queue associated with a virtual device to an address space identifier of a plurality of address space identifiers, wherein a virtual machine includes the virtual device and a plurality of unprivileged components including a first unprivileged component of a guest, each of the plurality of address space identifiers respectively identifies at least one memory address allocated as a respective workload queue, and each respective workload queue is allocated by the guest as device memory for the virtual device;
detect, by a hypervisor, a request written by the first unprivileged component of the guest into associated with the queue;
locate, by the hypervisor, a page table associated with the virtual device based on the address space identifier; and
translate the request with the page table, wherein translating the request yields a memory address of a message.

* * * * *